United States Patent
Sakr

(10) Patent No.: US 11,776,390 B2
(45) Date of Patent: Oct. 3, 2023

(54) MACHINE LEARNING SYSTEM FOR ROADWAY FEATURE EXTRACTION FROM WIRELESS VEHICLE DATA

(71) Applicant: Toyota Motor Engineering & Manufacturing North America, Inc., Erlanger, KY (US)

(72) Inventor: Ahmed Sakr, Mountain View, CA (US)

( * ) Notice: Subject to any disclaimer, the term of this patent is extended or adjusted under 35 U.S.C. 154(b) by 728 days.

(21) Appl. No.: 16/393,897

(22) Filed: Apr. 24, 2019

(65) Prior Publication Data

US 2020/0342750 A1   Oct. 29, 2020

(51) Int. Cl.
| | |
|---|---|
| *G08G 1/01* | (2006.01) |
| *G08G 1/16* | (2006.01) |
| *H04W 4/40* | (2018.01) |
| *G05D 1/02* | (2020.01) |
| *G06F 16/29* | (2019.01) |
| *G06F 16/23* | (2019.01) |

(52) U.S. Cl.
CPC ......... *G08G 1/0112* (2013.01); *G05D 1/0274* (2013.01); *G05D 1/0276* (2013.01); *G06F 16/23* (2019.01); *G06F 16/29* (2019.01); *G08G 1/0145* (2013.01); *G08G 1/163* (2013.01); *H04W 4/40* (2018.02); *G05D 2201/0213* (2013.01)

(58) Field of Classification Search
CPC .... G08G 1/0112; G08G 1/0145; G08G 1/163; G05D 1/0274; G05D 1/0276; G05D 2201/0213; H04W 4/40; G06F 16/23; G06F 16/29

See application file for complete search history.

(56) References Cited

U.S. PATENT DOCUMENTS

| | | | | |
|---|---|---|---|---|
| 8,884,782 | B2* | 11/2014 | Rubin | H04W 74/0816 340/436 |
| 10,121,367 | B2* | 11/2018 | Jammoussi | G08G 1/0141 |
| 2015/0300828 | A1* | 10/2015 | Tseng | G01C 21/32 701/532 |
| 2017/0316684 | A1* | 11/2017 | Jammoussi | G08G 1/096775 |
| 2018/0188044 | A1* | 7/2018 | Wheeler | H04L 69/40 |
| 2018/0188045 | A1* | 7/2018 | Wheeler | G06K 9/00791 |
| 2020/0324795 | A1* | 10/2020 | Bojarski | G06K 9/00798 |

* cited by examiner

*Primary Examiner* — Tarek Elarabi
(74) *Attorney, Agent, or Firm* — Burbage Law, P.C.; Jon-Michael Burbage

(57) ABSTRACT

The disclosure includes embodiments for extracting roadway features from Vehicle-to-Everything (V2X) data to build a map having an improved accuracy. In some embodiments, a method for a connected vehicle includes transmitting, via a communication unit of the connected vehicle, a V2X message that includes V2X data. The method includes receiving, via the communication unit, map data describing a map that depicts one or more roadway features in a roadway region of the connected vehicle. The one or more roadway features are generated through a vehicle clustering analysis based on an aggregation of the V2X data in the roadway region so that an accuracy of the map is improved. The method includes modifying an operation of a vehicle control system of the connected vehicle based on the map data to improve the operation of the connected vehicle by reducing a risk of a collision involving the connected vehicle.

17 Claims, 8 Drawing Sheets

V2X Data

- Vehicles and other client devices equipped with Dedicated Short Range Communication ("DSRC") transmit a Basic Safety Message ("BSM") at a regular interval.

- Each BSM includes the following DSRC data describing one or more of the following for the vehicle that originally sent the BSM:
  - (1) GPS Data Describing the Location of the Vehicle, where the GPS Data may be so accurate that it describes the specific parking space the Vehicle is parked in;
  - (2) Heading Data Describing a past Direction of travel for the Vehicle, if any;
  - (3) Velocity Data Describing a past Velocity of the Vehicle; and
  - (4) Path History of Vehicle (e.g., path history data).

Figure 6A

650 

V2X Data

Part 1
Sensor Data including:
(1) GPS Data (local 3D)
- Latitude
- Longitude
- Elevation
- Positional accuracy
- Time (2) Vehicle Motion Data
- Transmission state
- Speed
- Heading
- Steering wheel angle
- Acceleration set (4-way, i.e., 3 axes of acceleration plus yaw rate)
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 6B

MACHINE LEARNING SYSTEM FOR ROADWAY FEATURE EXTRACTION FROM WIRELESS VEHICLE DATA

BACKGROUND

The specification relates to a machine learning system for roadway feature extraction from wireless vehicle data. Specifically, in some embodiments the specification relates to a learning client that is operable to extract roadway features from Vehicle-to-Everything (V2X) data and build a digital map having improved accuracy.

Automated vehicles are being developed for future deployment. An automated vehicle includes an autonomous driving system that controls the operation of the automated vehicle. To function properly, automated driving systems rely on digital maps (herein "map" or "maps") with accurate roadway information. Digital maps are described by map data. Map data is digital data that describes the features of a roadway that exists in the real-world.

In some example scenarios, map data (e.g., map data that describes a new road) may not be available.

In other example scenarios, although prior map data for a roadway environment is available to the autonomous vehicles, the prior map data may be outdated due to changes in the roadway environment. The term "prior map data" refers to a subset of an automated vehicle's stored map data that was received by the automated vehicle in the past (e.g., via V2X communications) or generated by the automated vehicle in the past (e.g., based on the automated vehicle's own sensor measurements). Accordingly, the prior map data stored by an autonomous vehicle may or may not be updated to accurately reflect the real-world. If the prior map data relied on by the autonomous vehicle is not updated, it may result in errors in a map that is generated based on the map data.

SUMMARY

One general aspect of embodiments described herein includes a computer program product including a non-transitory memory of an onboard vehicle computer system of a connected vehicle storing computer-executable code that, when executed by a processor, causes the processor to: transmit, via a communication unit of the connected vehicle, a V2X message that includes V2X data; receive, via the communication unit, map data describing a map that depicts one or more roadway features in a roadway region of the connected vehicle, where the one or more roadway features are generated through a vehicle clustering analysis based on an aggregation of the V2X data in the roadway region, where the vehicle clustering analysis applies a machine learning process to update the map as the one or more roadway features change over time and to improve an accuracy of the map; and modify an operation of a vehicle control system of the connected vehicle based on the map data to improve the operation of the connected vehicle by reducing a risk of a collision involving the connected vehicle. Other embodiments of this aspect include corresponding computer systems, apparatus, and computer programs recorded on one or more computer storage devices, each configured to perform the actions of the methods.

Implementations may include one or more of the following features. The computer program product where the vehicle clustering analysis includes a generation of cluster data and an analysis of the cluster data to generate the one or more roadway features. The computer program product where the cluster data describes one or more clusters with respect to an attribute of vehicles present in the roadway region and one or more cluster parameters for the one or more clusters. The computer program product where each of the one or more clusters includes a cluster of vehicle travel trajectories and represents a different lane in a roadway of the roadway region respectively. The computer program product where the vehicle clustering analysis includes a formation of a feedback loop as more V2X data is aggregated over time so that an accuracy of the one or more roadway features is improved over time. Implementations of the described techniques may include hardware, a method or process, or computer software on a computer-accessible medium.

One general aspect includes a method for a connected vehicle, including: transmitting, via a communication unit of the connected vehicle, a V2X message that includes V2X data; receiving, via the communication unit, map data describing a map that depicts one or more roadway features in a roadway region of the connected vehicle, where the one or more roadway features are generated through a vehicle clustering analysis based on an aggregation of the V2X data in the roadway region so that an accuracy of the map is improved; and modifying an operation of a vehicle control system of the connected vehicle based on the map data to improve the operation of the connected vehicle by reducing a risk of a collision involving the connected vehicle. Other embodiments of this aspect include corresponding computer systems, apparatus, and computer programs recorded on one or more computer storage devices, each configured to perform the actions of the methods.

Implementations may include one or more of the following features. The method where the vehicle clustering analysis includes a generation of cluster data based on the aggregation of the V2X data and an analysis of the cluster data to generate the one or more roadway features. The method where the cluster data describes one or more clusters with respect to an attribute of vehicles present in the roadway region and one or more cluster parameters for the one or more clusters. The method where the one or more cluster parameters include one or more speed profiles for the one or more clusters respectively. The method where each of the one or more clusters includes a cluster of vehicle travel trajectories and represents a different lane in a roadway of the roadway region respectively. The method where the vehicle clustering analysis applies a machine learning process to continuously update and improve the map as the one or more roadway features change over time. The method where the vehicle clustering analysis includes a formation of a feedback loop as more V2X data is aggregated over time so that an accuracy of the one or more roadway features is improved over time. The method further including: aggregating sensor data recorded by an onboard sensor of the connected vehicle, an onboard sensor of another connected vehicle or a combination thereof; and analyzing the sensor data to generate the V2X data. The method where the one or more roadway features include one or more of a number of lanes in each direction, a location of an auxiliary lane, a location of an entrance ramp, a location of an exit ramp, a location where two lanes merge together, a location of a lane obstruction, a location of a stop sign and a location of a traffic light. Implementations of the described techniques may include hardware, a method or process, or computer software on a computer-accessible medium.

One general aspect includes a system including an onboard vehicle computer system of a connected vehicle including a non-transitory memory storing computer code which, when executed by the onboard computer system, causes the onboard computer system to: transmit, via a communication unit of the connected vehicle, a V2X message that includes V2X data; receive, via the communication unit, map data describing a map that depicts one or more roadway features in a roadway region of the connected vehicle, where the one or more roadway features are generated through a vehicle clustering analysis based on an aggregation of the V2X data in the roadway region so that an accuracy of the map is improved; and modify an operation of a vehicle control system of the connected vehicle based on the map data to improve the operation of the connected vehicle by reducing a risk of a collision involving the connected vehicle. A collision may include the connected vehicle colliding with an object or being involved in a near-miss scenario where the connected vehicle nearly collides with the object but does not actually collide with the object. Such near-miss scenarios are undesirable because they may affect a passenger of the connected vehicle, for example, by frightening the passenger. Other embodiments of this aspect include corresponding computer systems, apparatus, and computer programs recorded on one or more computer storage devices, each configured to perform the actions of the methods.

Implementations may include one or more of the following features. The system where the vehicle clustering analysis includes a generation of cluster data based on the aggregation of the V2X data and an analysis of the cluster data to generate the one or more roadway features. The system where the cluster data describes one or more clusters with respect to an attribute of vehicles present in the roadway region and one or more cluster parameters for the one or more clusters. The system where the one or more cluster parameters include one or more speed profiles for the one or more clusters respectively. The system where each of the one or more clusters includes a cluster of vehicle travel trajectories and represents a different lane in a roadway of the roadway region respectively. The system where the vehicle clustering analysis applies a machine learning process to continuously update and improve the map as the one or more roadway features change over time. The system where the vehicle clustering analysis includes a formation of a feedback loop as more V2X data is aggregated over time so that an accuracy of the one or more roadway features is improved over time. The system where the computer code, when executed by the onboard computer system, causes the onboard computer system to: aggregate sensor data recorded by an onboard sensor of the connected vehicle, an onboard sensor of another connected vehicle or a combination thereof; and analyze the sensor data to generate the V2X data. The system where the one or more roadway features include one or more of a number of lanes in each direction, a location of an auxiliary lane, a location of an entrance ramp, a location of an exit ramp, a location where two lanes merge together, a location of a lane obstruction, a location of a stop sign and a location of a traffic light. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 6A-6B are graphical representations illustrating examples of V2X data generated by a vehicle according to some embodiments.

DETAILED DESCRIPTION

Figure 1A:
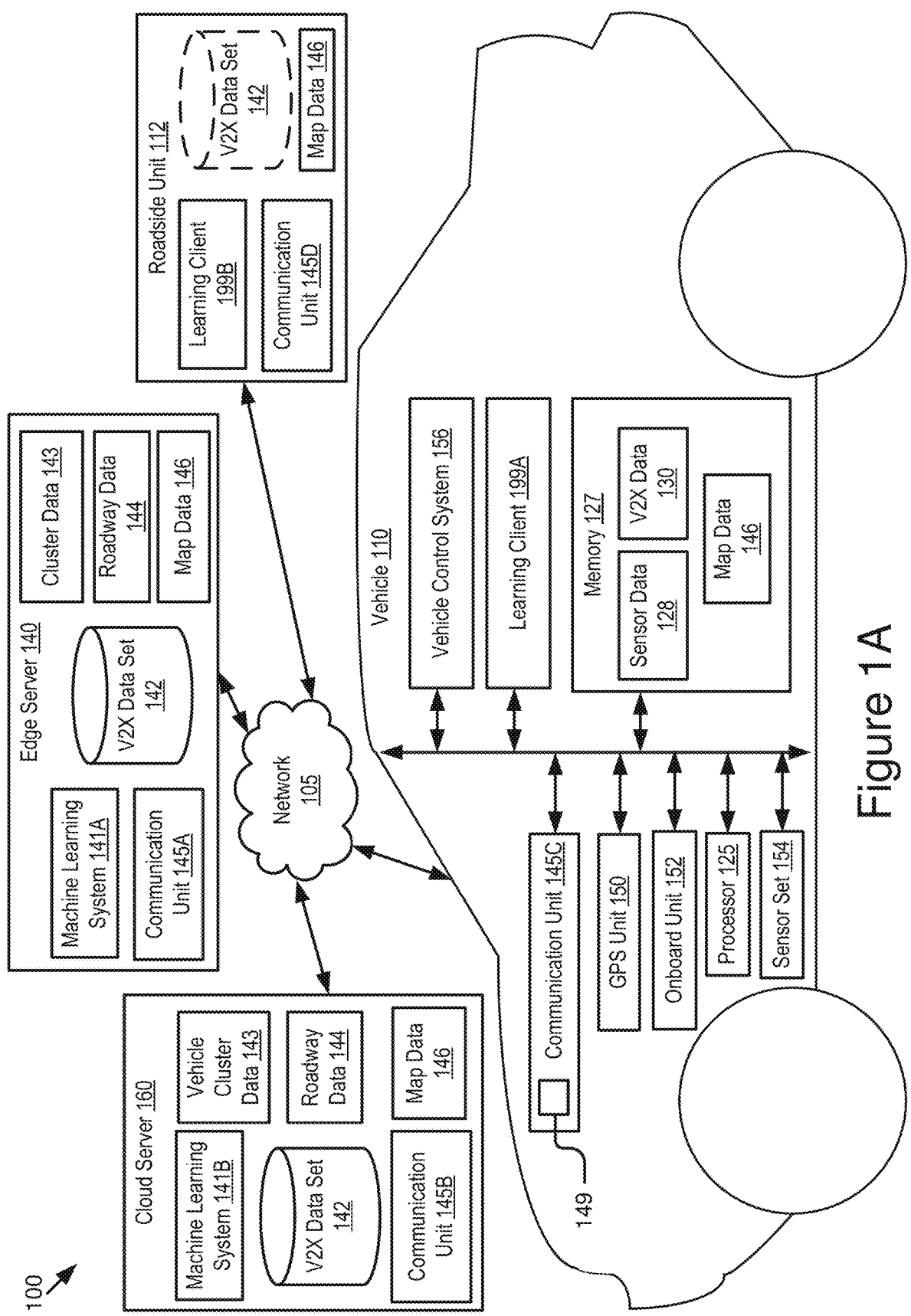
FIG. 1A is a block diagram illustrating an operating environment for a learning client and a machine learning system according to some embodiments.

Accurate maps with information that describes roadway features in roadway environments are beneficial for automated driving applications. Existing solutions that generate high definition maps for roadway environments may require exabytes of data for the map generation. The existing solutions are not adequate for at least two example reasons. Firstly, they may require a large amount of time to upload digital data to the cloud server because this digital data for the map generation is very large, e.g., exabytes of data. Secondly, the existing solutions may require a large amount of time for the cloud server to analyze the digital data because a collection of the digital data received from multiple vehicles has multiple exabytes of data. As a result, the existing solutions are not sufficiently dynamic.

Described herein are embodiments of a machine learning system and a learning client that cooperate with one another to extract roadway features from V2X data and to provide a map having an improved accuracy based on the extracted roadway features. For example, the machine learning system and the learning client cooperate with one another to use V2X data generated by real-world vehicles to generate accurate maps. These generated maps can be continuously updated and improved as roadway features change over time.

Compared with the existing solutions, the machine learning system and the learning client described herein are more dynamic and can operate with a reduced time. For example, the machine learning system and the learning client are able to provide their functionality using V2X data that is much smaller (e.g., megabytes or kilobytes of data) than the digital data used by the existing solutions. In a further example, the learning client installed in a particular vehicle is able to upload its V2X data to a server in a shorter amount of time compared with the existing solutions. The machine learning system installed in the server can analyze an aggregation of V2X data received from various vehicles with a shorter time compared with the existing solutions. Here, an example of V2X data uploaded by the learning client is the normal data that is included in a Basic Safety Message (BSM), which is a relatively small data set compared with that used in the existing solutions.

Additional example benefits of embodiments described herein are provided here. For example, the machine learning system is capable of aggregating V2X data from various vehicles and executing a vehicle clustering analysis on the aggregated V2X data. The vehicle clustering analysis enables roadway features in a particular roadway region of interest to be extracted accurately and updated timely even if the roadway features change over time. Specifically, a feedback loop is formed for the vehicle clustering analysis as more V2X data is aggregated over time so that an accuracy of the extracted roadway features is improved over time. As a result, a map generated based on the roadway features can be kept up to date having an improved accuracy. For example, the map can be continuously updated and improved as the roadway features change over time.

An example overview of the learning client and the machine learning system is provided here. In some embodiments, the learning client described herein includes software installed in an onboard unit of a connected vehicle. The machine learning system described herein includes software installed in a cloud server. Alternatively, the machine learning system is an element of an edge server instead of a cloud server.

Assume that two or more connected vehicles on a roadway environment include their own instance of the learning client. The learning client of a particular connected vehicle uses onboard sensors of this connected vehicle to build V2X data that describes information about this connected vehicle. The connected vehicle includes a communication unit that is operable to transmit V2X messages. The learning client causes the communication unit to transmit a V2X message including the V2X data to the cloud server or the edge server. Optionally, the learning client relays the V2X message to a roadside unit which then uploads the V2X data to the cloud server.

It is understood that modern vehicles may be required to be compliant with the Dedicated Short Range Communication (DSRC) standard. Vehicles that are compliant with the DSRC standard broadcast BSMs. Vehicles that broadcast DSRC messages are referred to as "DSRC transmitters." Vehicles that receive the DSRC messages are referred to as "DSRC receivers." DSRC messages are a type of V2X message. DSRC messages include V2X data that describes state information about the DSRC transmitter (e.g., its location, speed, heading, etc.). This state information is needed for a proper operation of Advanced Driver Assistance Systems (ADAS systems) and autonomous driving systems. V2X data is usually smaller in size so that it can be easily transmitted and received in highly mobile environments. For example, a typical DSRC message includes V2X data that is only a few megabytes (or kilobytes) in size.

In some embodiments, the V2X data transmitted by each connected vehicle is the normal data that is included in a BSM that the connected vehicle already has to generate and broadcast to other vehicles. As such, the V2X data used herein is small in size (e.g., kilobytes or megabytes).

The machine learning system receives various V2X data from various different connected vehicles which are present on a same roadway and builds a V2X data set. The machine learning system executes a machine learning process to analyze the V2X data set to determine roadway data for a particular roadway. For example, the machine learning system performs a vehicle clustering analysis on the V2X data set to determine roadway data for a particular roadway. The roadway data includes digital data that describes roadway features that are present in the roadway.

In some embodiments, a feedback loop is formed. For example, as the machine learning system receives more V2X data over time, the machine learning system continuously generates or updates the roadway data for the particular roadway. Thus, this roadway data is accurate and up to date. In this way the V2X data serves as feedback that improves the accuracy of the roadway data over time.

In some embodiments, the accuracy of the roadway data improves over time even if the roadway features for the roadway do not change. This is because the roadway features described by the roadway data become more accurate as more and more information is received about the machine learning system.

Examples of roadway features described herein include a total number of lanes included in each direction of a roadway, a location of an auxiliary lane, a location of an entrance ramp and a location of an exit ramp. Further examples of the roadway features may include a location where two lanes merge together, a lane obstruction, a location of a stop sign and a location of a traffic light, etc. Other examples for the roadway features are possible.

As described herein, examples of V2X communications include, but are not limited to, one or more of the following: DSRC (including BSMs and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X message) described herein include, but are not limited to, the following messages: a DSRC message; a BSM message; a LTE message; a LTE-V2X message (e.g., a LTE-V2V message, a LTE-V2I message, a LTE-V2N message, etc.); a 5G-V2X message; and a millimeter wave message, etc.

Example Overview

Referring to FIG. 1A, depicted is an operating environment 100 for a learning client 199 and a machine learning system 141 according to some embodiments. The operating environment 100 may include one or more of the following elements: a vehicle 110; a roadside unit 112; an edge server 140; and a cloud server 160. These elements of the operating environment 100 may be communicatively coupled to a network 105. In practice, the operating environment 100 may include any number of vehicles 110, roadside units 112, edge servers 140, cloud servers 160 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS) and multimedia messaging service (MMS). In some embodiments, the network 105 further includes networks for hypertext transfer protocol (HTTP), direct data connection, wireless application protocol ("WAP"), e-mail, DSRC, full-duplex wireless communication and mmWave. In some embodiments, the network 105 further includes networks for WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE, 5G-V2X or any other mobile data network or combination of mobile data networks. Further, the network 105 may include one or more IEEE 802.11 wireless networks.

The edge server 140 includes a processor-based computing device which is installed in a roadside unit ("RSU") or some other processor-based infrastructure component of a roadway. The roadway may include multiple edge servers 140. Each edge server 140 includes an instance of the machine learning system. For example, in the operating environment 100 shown in FIG. 1A, the edge server 140 includes a machine learning system 141A. The edge server 140 may also include a communication unit 145A, a V2X data set 142, cluster data 143, roadway data 144 and map data 146.

In some embodiments, edge servers 140 are not available. For example, roadside units may not be available in rural environments to serve as edge servers. Accordingly, the cloud server 160 hosts an instance of the machine learning system (e.g., a machine learning system 141B) so that this cloud-based machine learning system can serve rural vehicles. Accordingly, embodiments described herein are applicable in urban environments as well as rural environments. In some embodiments, any combination of cloud servers 160 and edge servers 140 may include instances of the machine learning system. In this way, the functionality of the machine learning system is implemented in a distributed fashion among two or more endpoints connected to the network 105. The cloud server 160 may also include a communication unit 145B, the V2X data set 142, the cluster data 143, the roadway data 144 and the map data 146.

The machine learning systems 141A and 141B may provide similar functionality and may be referred to herein as "machine learning system 141" individually or collectively.

In some embodiments, the machine learning system 141 includes code and routines that are operable, when executed by a processor of the edge server 140 or the cloud server 160, to cause the processor to generate a map having an improved accuracy. In some embodiments, the machine learning system 141 may be implemented using hardware including a field-programmable gate array ("FPGA") or an application-specific integrated circuit ("ASIC"). In some other embodiments, the machine learning system 141 may be implemented using a combination of hardware and software. The machine learning system 141 may be stored in a combination of the devices (e.g., servers or other devices), or in one of the devices.

For example, the machine learning system 141 aggregates various V2X data received from various vehicles to generate a V2X data set. The machine learning system 141 analyzes the V2X data set to identify a subset of V2X data that describes a same roadway region of interest. The machine learning system 141 determines one or more clusters with respect to an attribute of vehicles present in the roadway region. The machine learning system 141 determines one or more cluster parameters for the one or more clusters respectively. The machine learning system 141 generates cluster data that describes the one or more clusters and the one or more cluster parameters. The machine learning system 141 analyzes the cluster data to extract roadway data for each lane individually and the roadway region collectively. The machine learning system 141 analyzes the roadway data to generate map data that describes the roadway region and the roadway features described by the roadway data. The machine learning system 141 transmits the map data to each vehicle in the roadway region.

In some embodiments, the machine learning system 141 receives new instances of V2X data from vehicles in the roadway region and updates the V2X data set accordingly. The machine learning system 141 may repeat the operations described above to generate new roadway data and update the map data based on changes in the roadway features as described by the newly generated roadway data.

The machine learning system 141 is described below in more detail with reference to FIGS. 2 and 5.

The V2X data set 142 may include digital data that describes an aggregation of V2X data received from various vehicles 110.

The cluster data 143 may include digital data that describes one or more clusters with respect to an attribute of vehicles present in a roadway region of interest. The cluster data 143 may also include digital data that describes one or more cluster parameters for the one or more clusters respectively. For example, an example attribute is a vehicle travel trajectory. Each of the one or more clusters includes a cluster of vehicle travel trajectories and represents a different lane in a roadway of the roadway region respectively. The one or more cluster parameters include one or more speed profiles for the one or more clusters. Then, the cluster data 143 includes digital data describing the one or more clusters of vehicle travel trajectories and the one or more speed profiles for the one or more clusters.

The roadway data 144 includes digital data that describes one or more roadway features in the roadway region of interest.

The map data 146 includes digital data that describes a map with the one or more roadway features depicted in the roadway region of interest. In some embodiments, the map can be a high definition map (e.g., a three-dimensional high definition map).

The vehicle 110 may be any type of vehicle. For example, the vehicle 110 may include one of the following types of vehicles: a car; a truck; a sports utility vehicle; a bus; a semi-truck; a drone; or any other roadway-based conveyance. The vehicle 110 may be a connected vehicle that includes a communication unit and is capable of communicating with other endpoints connected to the network 105.

In some embodiments, the vehicle 110 is a DSRC-enabled vehicle which includes a DSRC radio and a DSRC-compliant GPS unit. The vehicle 110 may also include other V2X radios besides a DSRC radio. DSRC is not a requirement of embodiments described herein, and any form of V2X communications is also feasible.

The vehicle 110 may include one or more of the following elements: a processor 125; a memory 127; a communication unit 145C; a GPS unit 150; an onboard unit 152; a sensor set 154; a vehicle control system 156; and a learning client 199A. These elements of the vehicle 110 may be communicatively coupled to one another via a bus.

In some embodiments, the processor 125 and the memory 127 may be elements of an onboard vehicle computer system (such as computer system 300 described below with reference to FIG. 3). The onboard vehicle computer system may be operable to cause or control the operation of the learning client 199. The onboard vehicle computer system may be operable to access and execute the data stored on the memory 127 to provide the functionality described herein for the learning client 199 or its elements (see, e.g., FIG. 3).

The processor 125 includes an arithmetic logic unit, a microprocessor, a general-purpose controller, or some other processor array to perform computations and provide electronic display signals to a display device. The processor 125 processes data signals and may include various computing architectures. Example computing architectures include a complex instruction set computer (CISC) architecture, a reduced instruction set computer (RISC) architecture, or an architecture implementing a combination of instruction sets. The vehicle 110 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media. Example permanent storage devices include a hard disk drive, a floppy disk drive, a CD-ROM device, a DVD-ROM device, a DVD-RAM device, a DVD-RW device, and a flash memory device, etc. Further example permanent storage devices may include some other mass storage device for storing information on a more permanent basis. The vehicle 110 may include one or more memories 127.

The memory 127 may store one or more of the following elements: sensor data 128; V2X data 130; and the map data 146. The map data 146 is described above, and similar description will not be repeated here.

The sensor data 128 may include digital data that describes one or more sensor measurements recorded by the sensor set 154 of the vehicle 110. In some embodiments, the sensor data 128 may also include other sensor data received from other vehicles 110.

The V2X data 130 may include vehicle data related to the vehicle 110. For example, the V2X data 130 may be generated from the sensor data 128. The V2X data 130 may include a location, a speed and a heading of the vehicle 110. In a further example, the V2X data 130 may also include other vehicle data related to other vehicles 110 that are in the vicinity of the vehicle 110. Examples of the V2X data 130 are provided with reference to FIGS. 6A-6B.

In some embodiments, the GPS unit 150 is a conventional GPS unit of the vehicle 110. For example, the GPS unit 150 may include hardware that wirelessly communicates with a GPS satellite to retrieve data that describes a geographic location of the vehicle 110. In some embodiments, the GPS unit 150 is a DSRC-compliant GPS unit of the vehicle 110. The DSRC-compliant GPS unit is operable to provide GPS data describing the geographic location of the vehicle 110 with lane-level accuracy.

The lane-level accuracy indicates that the geographic location of the vehicle 110 has an accuracy of plus or minus 1.5 meters of its actual location in the real-world. A lane of a roadway is about 3 meters wide. Thus, an accuracy of plus or minus 1.5 meters is sufficiently precise that it enables other endpoints which receive the location data (via DSRC messages) to know the exact lane of travel of each vehicle on the roadway. The location data can be GPS data that describes the geographic location and the time when the vehicle 110 is at this geographic location.

The onboard unit 152 can include one or more processors and one or more memories. For example, the onboard unit 152 includes an electronic control unit (ECU). In some embodiments, the learning client 199A of the vehicle 110 is installed on the onboard unit 152.

The sensor set 154 includes one or more sensors that are operable to measure a roadway environment outside of the vehicle 110. For example, the sensor set 154 may include one or more sensors that record one or more physical characteristics of the roadway environment that is proximate to the vehicle 110. The memory 127 may store sensor data that describes the one or more physical characteristics recorded by the sensor set 154.

In some embodiments, the sensor set 154 may include one or more of the following vehicle sensors: a camera; a LIDAR sensor; a radar sensor; a laser altimeter; an infrared detector; a motion detector; a thermostat; and a sound detector. The sensor set 154 may also include one or more of the following sensors: a carbon monoxide sensor; a carbon dioxide sensor; an oxygen sensor; a mass air flow sensor; and an engine coolant temperature sensor. The sensor set 154 may also include one or more of the following sensors: a throttle position sensor; a crank shaft position sensor; an automobile engine sensor; a valve timer; an air-fuel ratio meter; and a blind spot meter. The sensor set 154 may also include one or more of the following sensors: a curb feeler; a defect detector; a Hall effect sensor, a manifold absolute pressure sensor; a parking sensor; a radar gun; a speedometer; and a speed sensor. The sensor set 154 may also include one or more of the following sensors: a tire-pressure monitoring sensor; a torque sensor; and a transmission fluid temperature sensor. The sensor set 154 may also include one or more of the following sensors: a turbine speed sensor (TSS); a variable reluctance sensor; a vehicle speed sensor (VSS); a water sensor; a wheel speed sensor; and any other type of automotive sensor.

The vehicle control system 156 may include an ADAS system or an autonomous driving system. The ADAS system or the autonomous driving system may provide some or all of the autonomous functionality for the vehicle 110. In some embodiments, the vehicle control system 156 may provide the autonomous functionality with aid of the map data 146 that describes a map in a roadway region where the vehicle 110 is located.

The roadside unit 112 includes an instance of the learning client (e.g., a learning client 199B) for relaying the V2X data from the vehicle 110 to the edge server 140 or the cloud server 160. The roadside unit 112 may aggregate various V2X data received from various different vehicles 110 to build the V2X data set 142 that includes each of these instances of V2X data. The learning client 199B of the roadside unit 112 may upload the V2X data set to the edge server 140 or the cloud server 160.

Alternatively, or additionally, the roadside unit 112 may receive the map data 146 from the edge server 140 or the cloud server 160 and forward the map data 146 to the vehicle 110 as well as other vehicles 110 in the same roadway region.

The roadside unit 112 may further include a communication unit 145D for communication with other endpoints (e.g., the cloud server 160, the edge server 140, the vehicle 110, etc.) that are connected to the network 105.

The communication units 145A, 145B, 145C and 145D may have similar structure and provide similar functionality and may be referred to herein as "communication unit 145" individually or collectively.

The communication unit 145 transmits and receives data to and from the network 105 or to another communication channel. In some embodiments, the communication unit 145 may include a DSRC transceiver, a DSRC receiver and other hardware or software necessary to make the vehicle 110 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods. Example wireless communication methods may include one or more of the following: IEEE 802.11; and IEEE 802.16, BLUETOOTH®. Example wireless communication methods may further include EN ISO 14906:2004 Electronic Fee Collection— Application interface EN 11253:2004 DSRC—Physical layer using microwave at 5.8 GHz (review). Example wireless communication methods may further include EN 12795: 2002 DSRC—DSRC Data link layer: Medium Access and Logical Link Control (review). Example wireless communication methods may further include EN 12834:2002 DSRC—Application layer (review) and EN 13372:2004 DSRC—DSRC profiles for RTTT applications (review). Example wireless communication methods may further include the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a cellular communications transceiver for sending and receiving data over a cellular communications network. For example, the data may be sent or received via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 may include a V2X radio 149. The V2X radio 149 may include a hardware element including a DSRC transmitter which is operable to transmit DSRC messages on the 5.9 GHz band. The 5.9 GHz band is reserved for DSRC messages. The hardware element may also include a DSRC receiver which is operable to receive DSRC messages on the 5.9 GHz band.

The learning clients 199A and 199B may provide similar functionality and may be referred to herein as "learning client 199" individually or collectively.

In some embodiments, the learning client 199 includes software that is operable, when executed by the processor 125, to cause the processor 125 to execute one or more steps of a method 400 described below with reference to FIG. 4. In some embodiments, the learning client 199 may be implemented using hardware including an FPGA or an ASIC. In some other embodiments, the learning client 199 may be implemented using a combination of hardware and software. The learning client 199 may be stored in a combination of the devices (e.g., servers or other devices), or in one of the devices.

In some embodiments, the learning client 199 may be installed in the onboard unit 152 of the vehicle 110. The learning client 199 includes code and routines that are operable, when executed by the processor 125 of the vehicle 110, to cause the processor 125 to provide V2X data to the edge server 140 or the cloud server 160. For example, the learning client 199 aggregates sensor data received from onboard sensors of the vehicle 110 and, optionally, other vehicles 110 that provide their own sensor data to the learning client 199 via wireless communications. The learning client 199 analyzes the sensor data to generate V2X data and causes the communication unit 145 of the vehicle 110 to transmit a V2X message that includes the V2X data as its payload. This V2X data may be broadcast or unicast to a particular endpoint such as the roadside unit 112, the edge server 140 or the cloud server 160.

The learning client 199 is described below in more detail with reference to FIGS. 3-4.

Figure 1B:
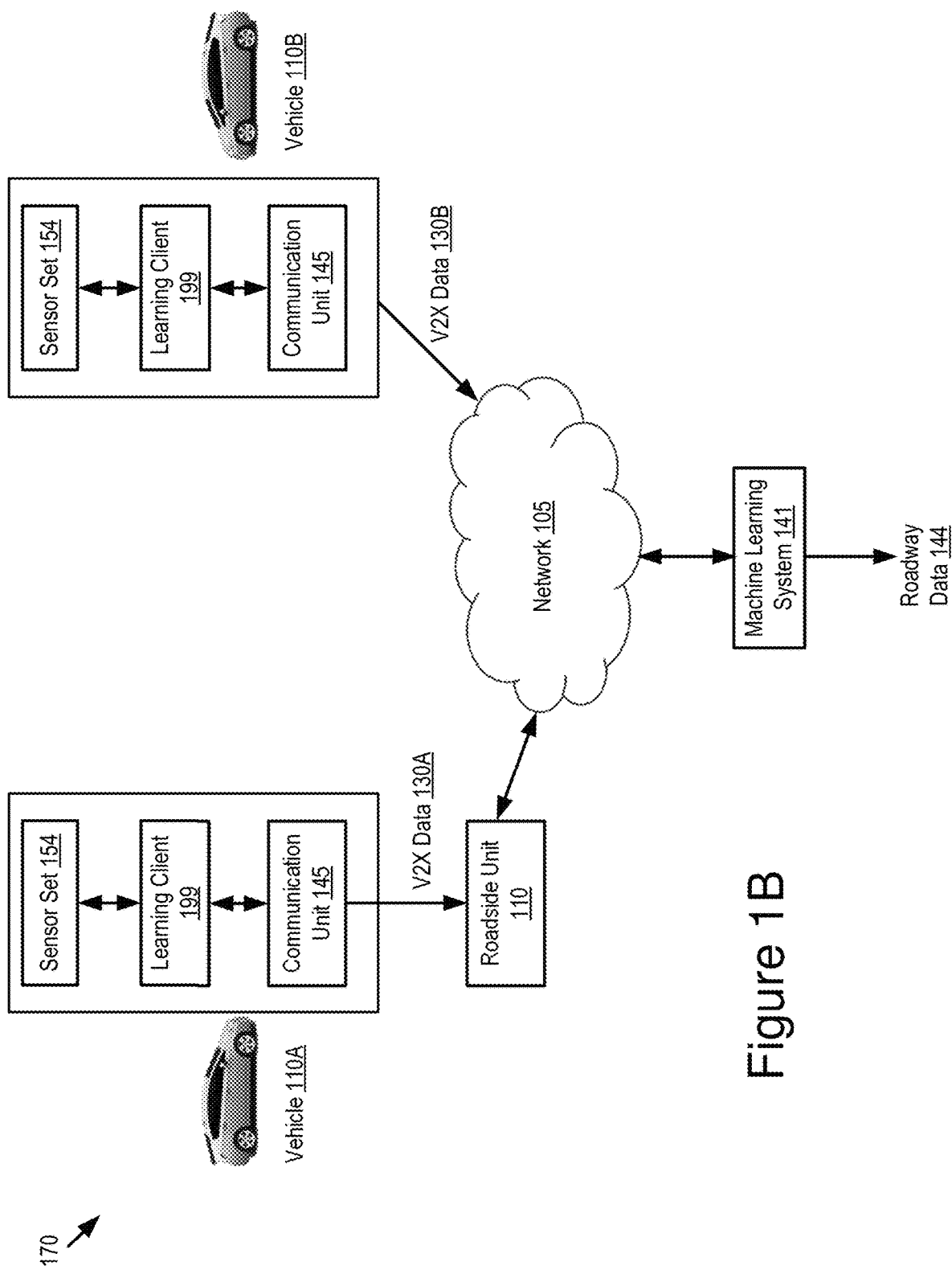
FIG. 1B is a block diagram illustrating an example architecture for the learning client and the machine learning system according to some embodiments.

Referring to FIG. 1B, illustrated is an example architecture 170 for the learning client 199 and the machine learning system 141 according to some embodiments. Two vehicles 110A and 110B are depicted in FIG. 1B by way of examples. In some examples, the example architecture 170 may include various vehicles 110 including the vehicles 110A and 110B.

The learning client 199 of the vehicle 110A causes the sensor set 154 of the vehicle 110A to record sensor data and analyzes the sensor data to generate V2X data 130A of the vehicle 110A. The learning client 199 transmits the V2X data 130A to the roadside unit 112 via the communication unit 145 of the vehicle 110A. The roadside unit 112 forwards the V2X data 130A to the machine learning system 141 via the network 105. The machine learning system 141 may be installed in the edge server 140 or the cloud server 160.

The learning client 199 of the vehicle 110B causes the sensor set 154 of the vehicle 110B to record sensor data and analyzes the sensor data to generate V2X data 130B of the vehicle 110B. The learning client 199 of the vehicle 110B causes the communication unit 145 of the vehicle 110B to transmit the V2X data 130B to the machine learning system 141 via the network 105.

In this way, the machine learning system 141 aggregates various V2X data received from various vehicles 110 (including the V2X data 130A from the vehicle 110A and the V2X data 130B from the vehicle 110B) to create a V2X data set. The machine learning system 141 generates roadway data 144 based on the V2X data set by performing a vehicle clustering analysis on the V2X data set. The vehicle clustering analysis is described below in more detail with reference to FIG. 2. The roadway data 144 describes one or more roadway features in a roadway region where the various vehicles 110 (including the vehicles 110A and 110B) are present.

The machine learning system 141 may generate map data describing a map of the roadway region based on the roadway data 144. The machine learning system 141 may provide this map data to the various vehicles 110 (including the vehicles 110A and 110B) present in the roadway region.

As each of the vehicles 110 records new sensor data and generates new V2X data, more V2X data can be received aggregated by the machine learning system 141, which may lead to an improvement on the extraction of the roadway features and the generation of the map data. In this way, a feedback loop is formed in the architecture 170 to improve an accuracy of the extracted roadway features as well as the generated map.

Machine Learning System

Figure 2:
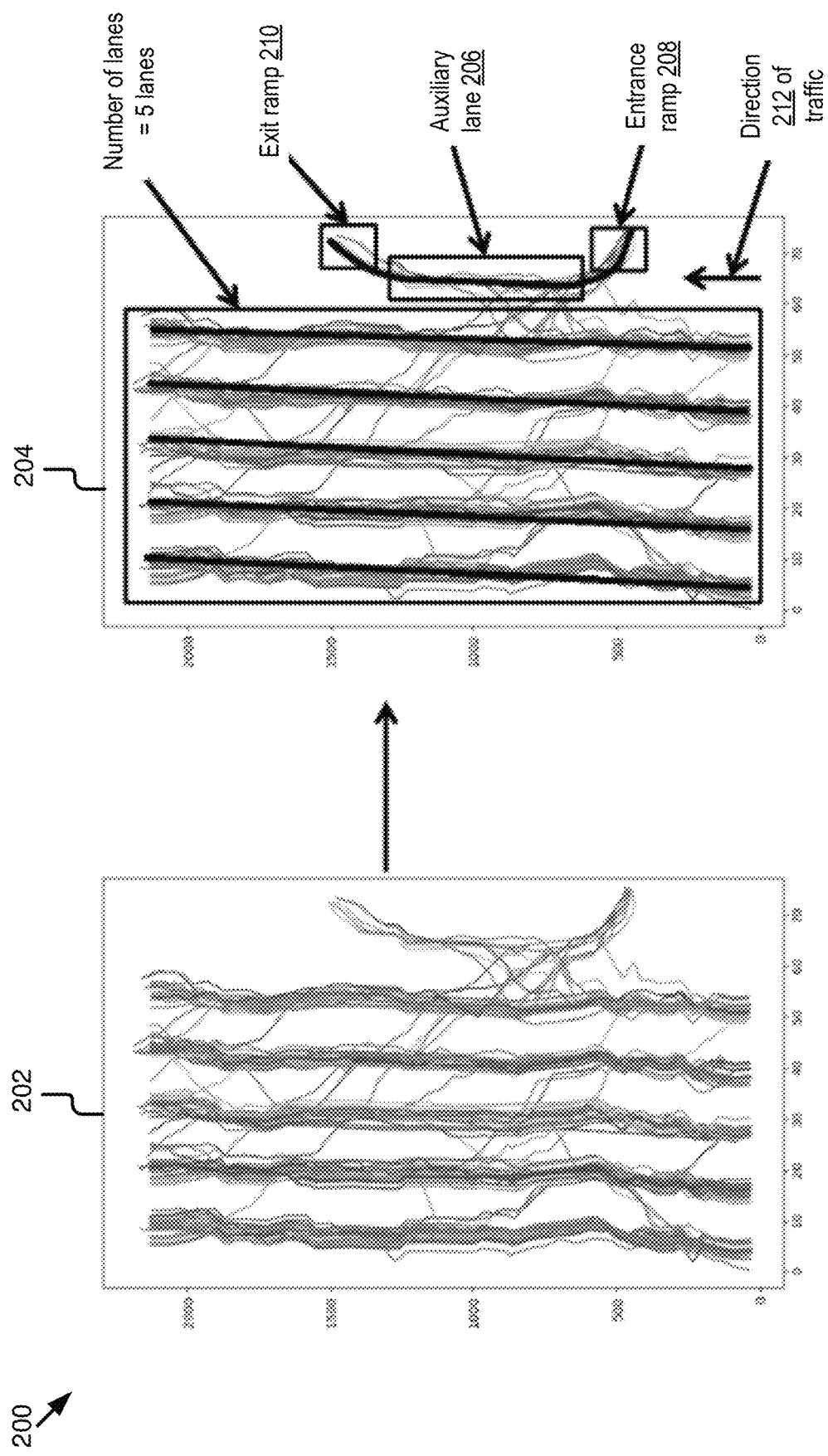
FIG. 2 is a graphical representation illustrating an example of roadway feature extraction provided by the machine learning system according to some embodiments.

Referring to FIG. 2, depicted is a graphical representation 200 illustrating an example of roadway feature extraction provided by the machine learning system 141 according to some embodiments.

In some embodiments, the machine learning system 141 receives various V2X data from various vehicles 110 via the network 105 and aggregates the various V2X data to generate a V2X data set. The machine learning system 141 may analyze the V2X data set to identify a subset of V2X data that describes a roadway region of interest. For example, the roadway region of interest may be a roadway region where a map of the region is to be provided. The subset of V2X data may include V2X data received from vehicles 110 present in the roadway region of interest.

In some embodiments, the machine learning system 141 performs a vehicle clustering analysis based on the aggregation of the V2X data to extract one or more roadway features in the roadway region of interest. Specifically, the machine learning system 141 may determine one or more clusters with respect to an attribute of vehicles 110 present in the roadway region of interest based on the subset of V2X data. The attribute may include, for example, a vehicle travel trajectory, a vehicle driving pattern (e.g., an acceleration or deceleration pattern) or any other vehicle driving attribute. The machine learning system 141 determines one or more cluster parameters for the one or more clusters respectively based on the subset of V2X data. The one or more cluster parameters may include one or more speed profiles, one or more stopping durations, one or more stopping patterns or any other parameters related to the clusters (or related to vehicles included in the clusters). The machine learning system 141 generates cluster data that describes the one or more clusters and the one or more cluster parameters for the one or more clusters. The machine learning system 141 analyzes the cluster data to determine roadway data that describes one or more roadway features in the roadway region of interest.

For example, with reference to FIG. 2, the machine learning system 141 tracks multiple vehicles present in a particular roadway region based on V2X data generated by the multiple vehicles. Each of the multiple vehicles may travel in a same roadway. For example, the multiple vehicles may travel in different lanes of the roadway. In some scenarios, some of the vehicles may switch lanes from time to time. As depicted in a box 202 of FIG. 2, the machine learning system 141 may track vehicle travel trajectories of the multiple vehicles based on the V2X data generated by the multiple vehicles.

As depicted in the example of FIG. 2, the machine learning system 141 determines multiple clusters of vehicle travel trajectories shown in a box 204 based on a result depicted in the box 202. Each cluster may represent a different lane in the roadway. The machine learning system 141 determines speed profiles for the clusters respectively based on the V2X data generated by the multiple vehicles. The machine learning system 141 generates cluster data describing the clusters of vehicle travel trajectories and the speed profiles for the clusters.

As depicted in the example of FIG. 2, by analyzing the cluster data, the machine learning system 141 may determine roadway features in the roadway region. For example, the machine learning system 141 determines roadway data for each lane individually and the roadway region collectively. In FIG. 2, the machine learning system 141 determines that there are 5 lanes on the roadway since there are 5 clusters of vehicle travel trajectories in the roadway. The machine learning system 141 also determines an auxiliary lane 206 having an entrance ramp 208 to enter the roadway and an exit ramp 210 to exit from the roadway. The machine learning system 141 may also determine a direction 212 of traffic for the roadway.

In some embodiments, the machine learning system 141 analyzes the roadway data to generate or update a map that describes the roadway region with the one or more extracted roadway features. The machine learning system 141 may transmit map data describing the map to one or more vehicles 110 present in the roadway region.

In some embodiments, the machine learning system 141 performs the above vehicle clustering analysis at least by applying a machine learning process to update the map as the one or more roadway features change over time and to improve an accuracy of the map. For example, the machine learning system 141 may continuously update and improve the map as the one or more roadway features change over time.

In some embodiments, the machine learning system 141 performs the above vehicle clustering analysis at least by forming a feedback loop as more V2X data is received and aggregated by the machine learning system 141 over time. As a result, an accuracy of the one or more roadway features as well as an accuracy of the map is improved over time.

Two example applications of the machine learning system 141 are provided here. Other example applications are also possible.

A first example application includes a lane obstruction detection. In some embodiments, the machine learning system 141 continuously compares the newly extracted roadway features (e.g., the number of lanes) with prior detected roadway features. If the number of lanes on the roadway has been reduced, the machine learning system 141 can detect a lane obstruction on the roadway and update the map accordingly. For example, with reference to FIG. 2, the machine learning system 141 detects that there are 5 lanes on the roadway. If the number of clusters of vehicle travel trajectories drops to 4 in a particular section of this roadway, the machine learning system 141 determines that one lane in this section of the roadway is closed or obstructed. Then, the machine learning system 141 updates the map accordingly. Afterwards, if the number of clusters of vehicle travel trajectories in this section of the roadway becomes 5 again, the machine learning system 141 determines that the obstruction does not exist anymore.

A second example application includes a detection on a location of a traffic controlling tool and a type of the traffic controlling tool. For example, a traffic controlling tool can be used to instruct a vehicle to slow down or stop completely and includes, for example, a yield sign, a stop sign or traffic lights. The machine learning system 141 may analyze the speed profile of each cluster, a stopping time and a stopping pattern of vehicles in each cluster. Based on the speed profile, the stopping time and the stopping pattern of each cluster, the machine learning system 141 determines a location of the traffic controlling tool and a type of the traffic controlling tool as the yield sign, the stop sign or the traffic lights.

Example Computer System

Figure 3:
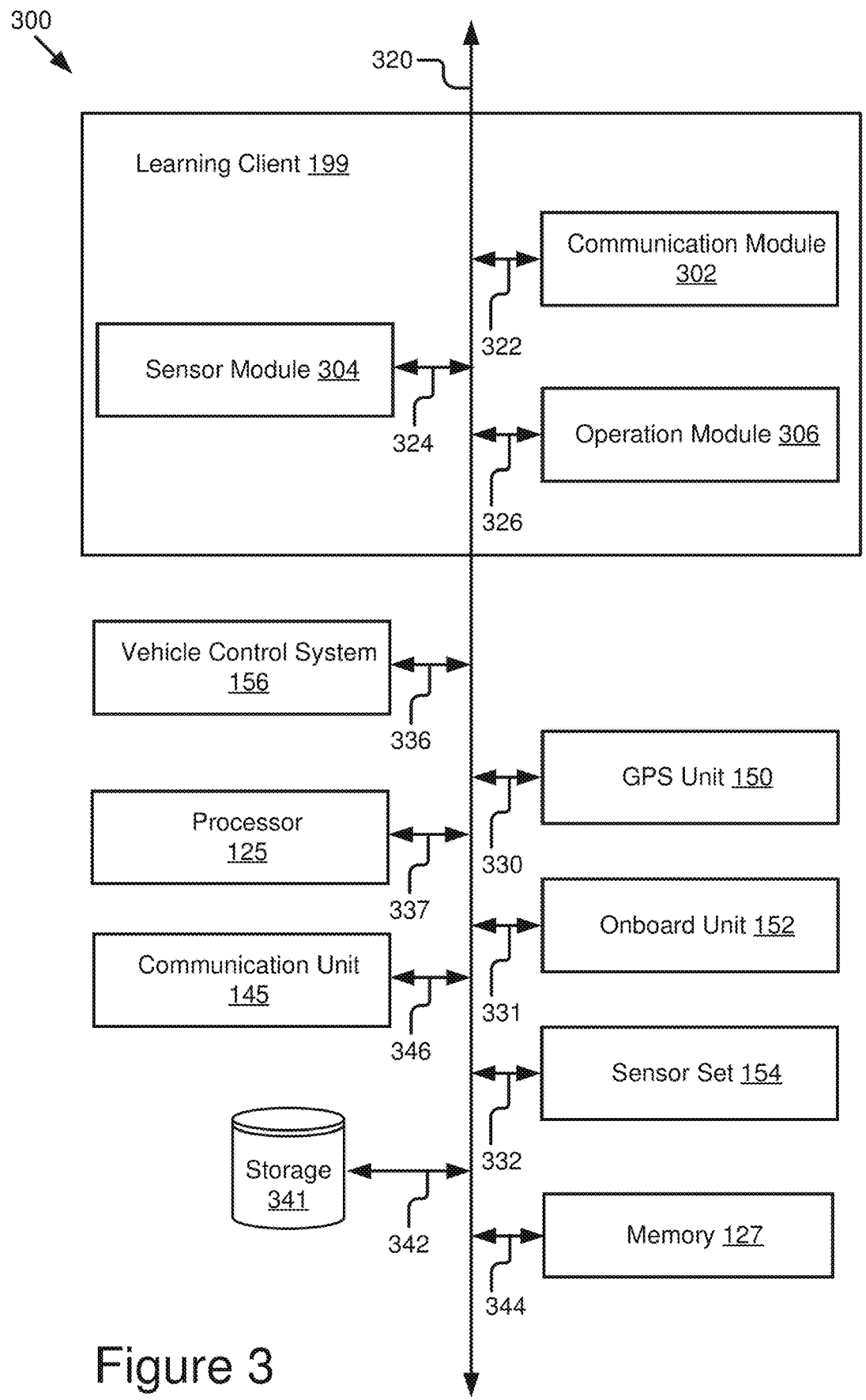
FIG. 3 is a block diagram illustrating an example computer system including the learning client according to some embodiments.

Referring now to FIG. 3, depicted is a block diagram illustrating an example computer system 300 including the learning client 199 according to some embodiments. In some embodiments, the computer system 300 may include a special-purpose computer system that is programmed to perform one or more steps of the method 400 described below with reference to FIG. 4.

In some embodiments, the computer system 300 may be an element of the vehicle 110. In some embodiments, the computer system 300 may be an onboard vehicle computer of the vehicle 110. In some embodiments, the computer system 300 may include an engine control unit, head unit or some other processor-based computing device of the vehicle 110.

The computer system 300 may include one or more of the following elements according to some examples: the learning client 199; the processor 125; and the communication unit 145. The computer system 300 may further include one or more of the following elements: the sensor set 154; the GPS unit 150; the memory 127; the onboard unit 152; the vehicle control system 156; and a storage 341. The components of the computer system 300 are communicatively coupled by a bus 320.

In the illustrated embodiment, the processor 125 is communicatively coupled to the bus 320 via a signal line 337. The communication unit 145 is communicatively coupled to the bus 320 via a signal line 346. The sensor set 154 is communicatively coupled to the bus 320 via a signal line 332. The GPS unit 150 is communicatively coupled to the bus 320 via a signal line 330. The storage 341 is communicatively coupled to the bus 320 via a signal line 342. The memory 127 is communicatively coupled to the bus 320 via a signal line 344. The onboard unit 152 is communicatively coupled to the bus 320 via a signal line 331. The vehicle control system 156 is communicatively coupled to the bus 320 via a signal line 336.

The following elements are described above with reference to FIG. 1A: the processor 125; the communication unit 145; the sensor set 154; the GPS unit 150; the onboard unit 152; the vehicle control system 156; and the memory 127. Those descriptions will not be repeated here.

The storage 341 can be a non-transitory storage medium that stores data for providing the functionality described herein. The storage 341 may be a dynamic random-access memory (DRAM) device, a static random-access memory (SRAM) device, flash memory, or some other memory devices. In some embodiments, the storage 341 also includes a non-volatile memory or similar permanent storage device and media (e.g., a hard disk drive, a floppy disk drive, a flash memory device, etc.) for storing information on a more permanent basis.

In the illustrated embodiment shown in FIG. 3, the learning client 199 includes: a communication module 302; a sensor module 304; and an operation module 306. These components of the learning client 199 are communicatively coupled to each other via the bus 320. In some embodiments, components of the learning client 199 can be stored in a single server or device. In some other embodiments, components of the learning client 199 can be distributed and stored across multiple servers or devices.

The communication module 302 can be software including routines for handling communications between the learning client 199 and other components of the computer system 300. In some embodiments, the communication module 302 can be stored in the memory 127 of the computer system 300 and can be accessible and executable by the processor 125. The communication module 302 may be adapted for cooperation and communication with the processor 125 and other components of the computer system 300 via a signal line 322.

The communication module 302 sends and receives data, via the communication unit 145, to and from one or more elements of the operating environment 100. For example, the communication module 302 receives or transmits, via the communication unit 145, a V2X message including V2X data. The communication module 302 may send or receive any of the data or messages described above with reference to FIGS. 1A and 1B via the communication unit 145.

In some embodiments, the communication module 302 receives data from the other components of the learning client 199 and stores the data in one or more of the storage 341 and the memory 127. The other components of the learning client 199 may cause the communication module 302 to communicate with the other elements of the computer system 300 or the operating environment 100 (via the communication unit 145). For example, the sensor module 304 may use the communication module 302 to communicate with the sensor set 154 and cause the sensor set 154 to record sensor data.

The sensor module 304 can be software including routines for using the sensor set 154 to record sensor data. In some embodiments, the sensor module 304 can be stored in the memory 127 of the computer system 300 and can be accessible and executable by the processor 125. The sensor module 304 may be adapted for cooperation and communication with the processor 125 and other components of the computer system 300 via a signal line 324.

In some embodiments, the sensor module 304 causes sensors in the sensor set 154 to record sensor data related to the vehicle 110 and receives the sensor data from the sensors. The sensor data may describe one or more sensor measurements of the vehicle 110. For example, the sensor module 304 may cause the GPS unit 150 to retrieve a geographic location of the vehicle 110 and a speedometer to report a speed of the vehicle 110. The sensor module 304 may send the sensor data to the operation module 306.

The operation module 306 can be software including routines for reporting V2X data to a server and receiving map data from the server. In some embodiments, the operation module 306 can be stored in the memory 127 of the computer system 300 and can be accessible and executable by the processor 125. The operation module 306 may be adapted for cooperation and communication with the processor 125 and other components of the computer system 300 via a signal line 326.

In some embodiments, the operation module 306 receives sensor data of the vehicle 110 from the sensor module 304. Alternatively, or additionally, the operation module 306 receives sensor data from other vehicles 110. The operation module 306 aggregates all the received sensor data.

In some embodiments, the operation module 306 analyzes the sensor data (e.g., the aggregated sensor data) to determine V2X data to be transmitted. The operation module 306 may cause the communication unit 145 to transmit the V2X data to the edge server 140 or the cloud server 160 in a form of a V2X message.

In some embodiments, the operation module 306 receives, via the communication unit 145, map data from the edge server 140 or the cloud server 160. The map data describes a map that depicts one or more roadway features in a roadway region of the vehicle 110. The one or more roadway features are generated through the vehicle clustering analysis described above based on an aggregation of the V2X data in the roadway region of the vehicle 110 so that an accuracy of the map is improved.

In some embodiments, the vehicle clustering analysis includes (1) a generation of cluster data based on the aggregation of the V2X data and (2) an analysis of the cluster data to generate the one or more roadway features. The cluster data describes one or more clusters with respect to an attribute of vehicles present in the roadway region and one or more cluster parameters for the one or more clusters. For example, the cluster data describes one or more clusters of vehicle travel trajectories and one or more speed profiles for the one or more clusters. Each of the one or more clusters represents a different lane in a roadway of the roadway region respectively.

In some embodiments, the vehicle clustering analysis applies a machine learning process to continuously update and improve the map as the one or more roadway features change over time. In some embodiments, the vehicle clustering analysis includes a formation of a feedback loop as more V2X data is aggregated over time so that an accuracy of the one or more roadway features is improved over time.

In some embodiments, the operation module 306 may modify an operation of the vehicle control system 156 of the vehicle 110 based on the map data to improve the operation of the vehicle 110 by reducing a risk of a collision involving the vehicle 110. For example, assume that (1) the vehicle 110 is currently traveling on an outer lane of a roadway and (2) the map depicts a roadway feature describing that an entrance ramp merges into the outer lane right ahead of a location of the vehicle 110. Based on this roadway feature depicted on the map, an ADAS system or an autonomous driving system of the vehicle 110 may control an operation of the vehicle 110 to change its lane in order to avoid traffic from the entrance ramp.

Example Processes

Figure 4:
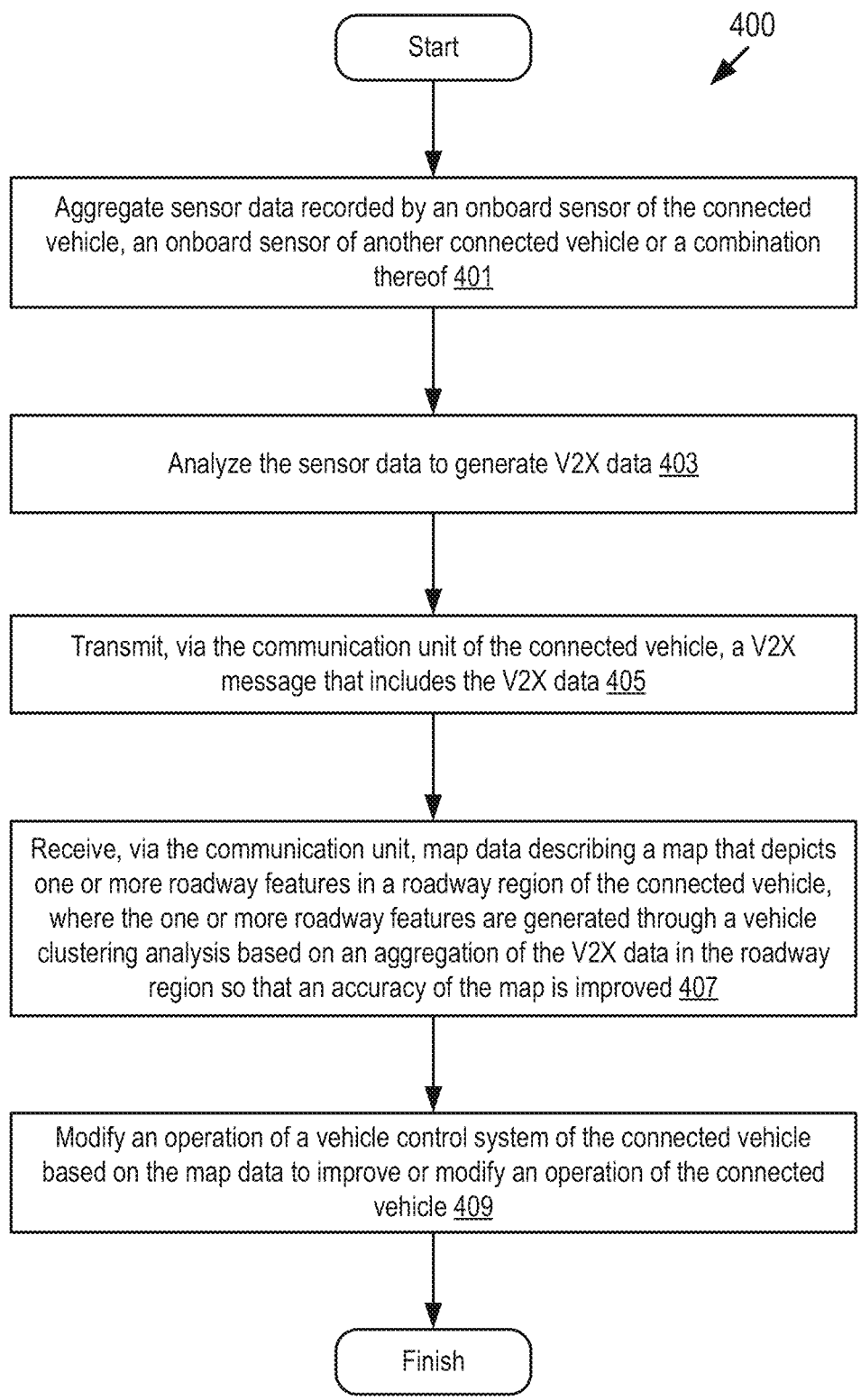
FIG. 4 depicts a method for providing map data that describes a map having an improved accuracy on a connected vehicle according to some embodiments.

Referring now to FIG. 4, depicted is a flowchart of an example method 400 for providing map data that describes a map having an improved accuracy on a connected vehicle (e.g., the vehicle 110) according to some embodiments. The steps of the method 400 are executable in any order, and not necessarily the order depicted in FIG. 4.

At step 401, the operation module 306 of the learning client 199 aggregates sensor data recorded by an onboard sensor of the connected vehicle, an onboard sensor of another connected vehicle or a combination thereof. For example, the aggregated sensor data may include sensor data generated by the connected vehicle itself, sensor data generated by other vehicles or a combination thereof.

At step 403, the operation module 306 analyzes the sensor data to generate V2X data. For example, the operation module 306 analyzes the aggregated sensor data to generate the V2X data.

At step 405, the operation module 306 transmits, via the communication unit 145 of the connected vehicle, a V2X message that includes the V2X data to the edge server 140 or the cloud server 160.

At step 407, the operation module 306 receives, via the communication unit 145, map data describing a map that depicts one or more roadway features in a roadway region of the connected vehicle. The one or more roadway features are generated through a vehicle clustering analysis based on an aggregation of the V2X data in the roadway region so that an accuracy of the map is improved. For example, the vehicle clustering analysis applies a machine learning process to update the map as the one or more roadway features change over time and to improve an accuracy of the map.

At step 409, the operation module 306 modifies an operation of the vehicle control system 156 of the connected vehicle based on the map data to improve the operation of the connected vehicle by reducing a risk of a collision involving the connected vehicle.

Figure 5:
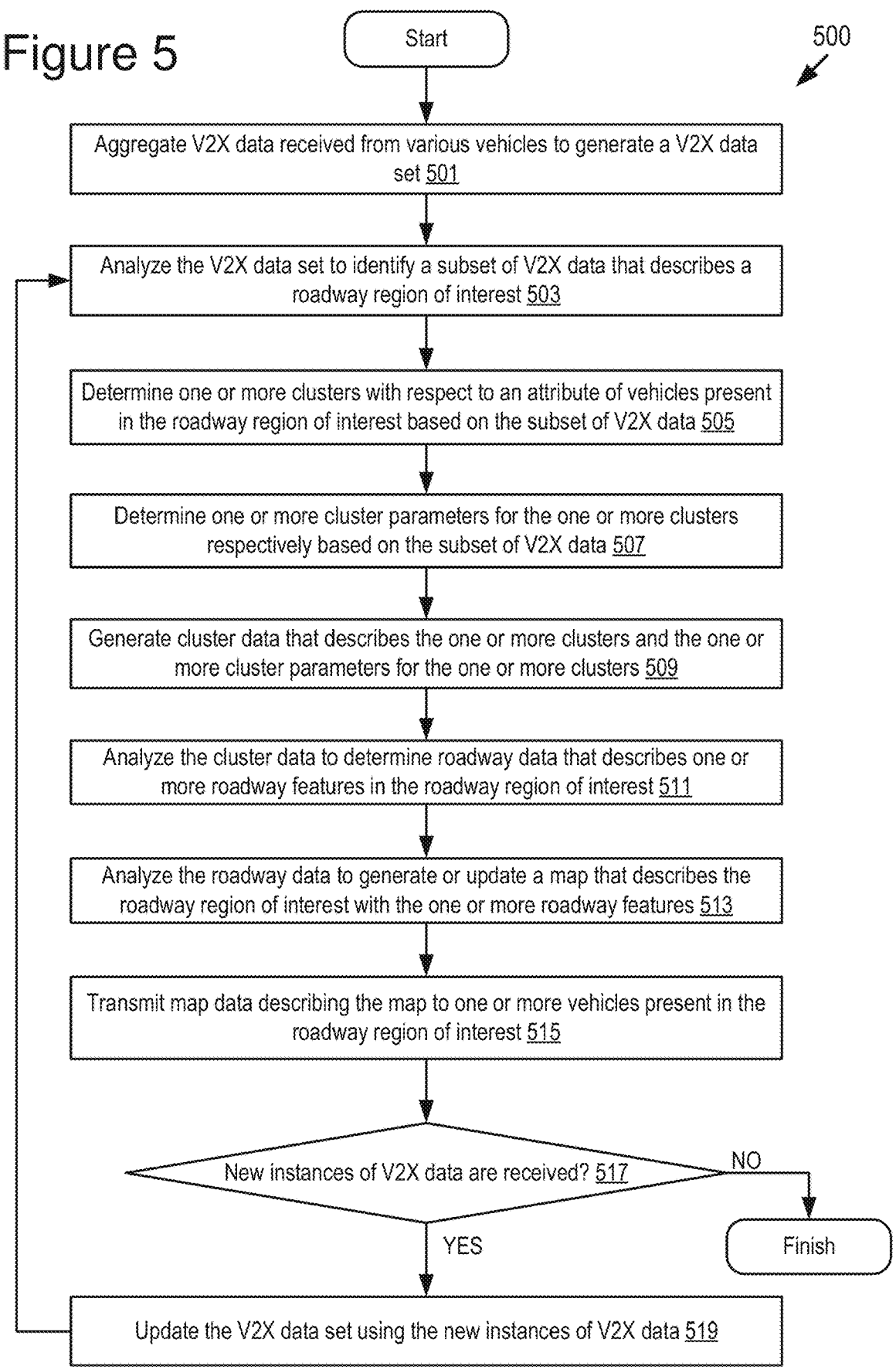
FIG. 5 depicts a method for extracting one or more roadway features from V2X data to build a map having an improved accuracy according to some embodiments.

FIG. 5 depicts a method 500 for extracting one or more roadway features from V2X data to build a map having an improved accuracy according to some embodiments. The steps of the method 500 are executable in any order, and not necessarily the order depicted in FIG. 5.

At step 501, the machine learning system 141 aggregates V2X data received from various vehicles to generate a V2X data set.

At step 503, the machine learning system 141 analyzes the V2X data set to identify a subset of V2X data that describes a roadway region of interest. For example, the roadway region of interest may be a roadway region where the vehicle 110 is present.

At step 505, the machine learning system 141 determines one or more clusters with respect to an attribute of vehicles present in the roadway region of interest based on the subset of V2X data.

At step 507, the machine learning system 141 determines one or more cluster parameters for the one or more clusters respectively based on the subset of V2X data.

At step 509, the machine learning system 141 generates cluster data that describes the one or more clusters and the one or more cluster parameters for the one or more clusters.

At step 511, the machine learning system 141 analyzes the cluster data to determine roadway data that describes one or more roadway features in the roadway region of interest.

At step 513, the machine learning system 141 analyzes the roadway data to generate or update a map that describes the roadway region of interest with the one or more roadway features.

At step 515, the machine learning system 141 transmits map data describing the map to one or more vehicles present in the roadway region of interest.

At step 517, the machine learning system 141 determines whether new instances of V2X data are received. Responsive to receiving new instances of V2X data, the method 500 moves to step 519. Otherwise, the method 500 ends.

At step 519, the machine learning system 141 updates the V2X data set using the new instances of V2X data. The method 500 moves back to step 503 to update the subset of V2X data based on the new instances of V2X data.

FIGS. 6A-6B are graphical representations 600 and 650 illustrating examples of V2X data generated by a vehicle according to some embodiments. Vehicles are increasingly equipped with DSRC. DSRC-equipped vehicles broadcast BSM messages at an adjustable rate of once every 0.10 seconds. These BSM messages include BSM data, which is a type of V2X data. FIG. 6A illustrates some of the V2X data that is included in each BSM message.

FIG. 6B depicts two parts of the DSRC message. Part 1 of the DSRC message includes core data elements, including a vehicle position, a heading, a speed, an acceleration, a steering wheel angle, and a vehicle size, etc. The DSRC message is transmitted at an adjustable rate of about 10 times per second. Part 2 of the DSRC message includes a variable set of data elements drawn from an extensive list of optional elements. Some of them are selected based on event triggers, e.g., ABS activated. They are added to Part 1 and sent as part of the DSRC message, but many are transmitted less frequently in order to conserve bandwidth. The DSRC message includes only current snapshots (with the exception of path data which is itself limited to a few second's worth of past history data).

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory storing computer-executable code that, when executed by a processor, causes the processor to:
    analyze Vehicle-to-Everything (V2X) data that describes a roadway region of interest;
    determine one or more clusters based on one or more attributes of vehicles present in the roadway region of interest based on the V2X data, wherein the one or more attributes include one or more driving patterns of the vehicles including one or more stopping durations;
    analyze, by a vehicle clustering analysis, the one or more clusters to determine roadway data that describes one or more roadway features in the roadway region of interest;
    generate a map that depicts the one or more roadway features in the roadway region, wherein the one or more roadway features are generated by the vehicle clustering analysis; and
    transmit map data describing the map to the vehicles in the roadway region of interest so that an operation of a vehicle control system of at least one of the vehicles in the roadway region is modified based on the map data.

2. The computer program product of claim 1, wherein each of the one or more clusters includes a cluster of vehicle travel trajectories and represents one or more of a different lane in a roadway of the roadway region and a location of a ramp in the roadway region respectively.

3. The computer program product of claim 1, wherein a particular cluster represents a different lane in a roadway of the roadway region of interest.

4. A method, comprising:
    analyzing Vehicle-to-Everything (V2X) data that describes a roadway region of interest;
    determining, by a processor, one or more clusters based on one or more attributes of vehicles present in the roadway region of interest based on the V2X data, wherein the one or more attributes include one or more driving patterns of the vehicles including one or more stopping durations;
    analyzing, by a vehicle clustering analysis, the one or more clusters to determine roadway data that describes one or more roadway features in the roadway region of interest;
    generating a map that depicts the one or more roadway features in the roadway region, wherein the one or more roadway features are generated by the vehicle clustering analysis; and
    transmitting map data describing the map to the vehicles in the roadway region of interest so that an operation of a vehicle control system of at least one of the vehicles in the roadway region is modified based on the map data.

5. The method of claim 4, wherein the method is executed by one or more of an edge server and a cloud server.

6. The method of claim 4, wherein each of the one or more clusters includes a cluster of vehicle travel trajectories and represents one or more of a different lane in a roadway of the roadway region and a location of a ramp in the roadway region respectively.

7. The method of claim 4, wherein the driving pattern includes at least one of an acceleration pattern or a deceleration pattern.

8. The method of claim 4, further comprising transmitting instructions to a connected vehicle based on the map data.

9. The method of claim 4, wherein the V2X data is generated based at least in part on sensor data recorded by an onboard sensor of the vehicle, an onboard sensor of another vehicle or a combination thereof.

10. The method of claim 4, wherein the one or more roadway features include one or more of a number of lanes in each direction, a location of an auxiliary lane, a location of an entrance ramp, a location of an exit ramp, a location where two lanes merge together, a location of a lane obstruction, a location of a stop sign and a location of a traffic light.

11. A system comprising:
    a computer system including a non-transitory memory storing computer code which, when executed by the computer system, causes the computer system to:
    analyze Vehicle-to-Everything (V2X) data that describes a roadway region of interest;
    determine one or more clusters based on one or more attributes of vehicles present in the roadway region of interest based on the V2X data, wherein the one or more attributes include one or more driving patterns of the vehicles including one or more stopping durations;
    analyze, by a vehicle clustering analysis, the one or more clusters to determine roadway data that describes one or more roadway features in the roadway region of interest;
    generate a map that depicts the one or more roadway features in the roadway region, wherein the one or more roadway features are generated by the vehicle clustering analysis; and
    transmit map data describing the map to the vehicles in the roadway region of interest so that an operation of a vehicle control system of at least one of the vehicles in the roadway region is modified based on the map data.

12. The system of claim 11, wherein the system is an element of an edge server and a cloud server.

13. The system of claim 11, wherein each of the one or more clusters includes a cluster of vehicle travel trajectories and represents one or more of a different lane in a roadway of the roadway region and a location of a ramp in the roadway region respectively.

14. The system of claim 11, wherein a particular cluster represents a different lane in a roadway of the roadway region of interest.

15. The system of claim 11, further comprising transmitting instructions to a connected vehicle based on the map data.

16. The system of claim 11, wherein the computer code, when executed by the computer system, causes the computer system to generate, based at least in part on sensor data recorded by a first onboard sensor of a first connected vehicle, a second onboard sensor of a second connected vehicle or a combination thereof.

17. The system of claim 11, wherein the one or more roadway features include one or more of a number of lanes in each direction, a location of an auxiliary lane, a location of an entrance ramp, a location of an exit ramp, a location where two lanes merge together, a location of a lane obstruction, a location of a stop sign and a location of a traffic light.

\* \* \* \* \*